(12) United States Patent
Guan et al.

(10) Patent No.: US 10,574,279 B2
(45) Date of Patent: Feb. 25, 2020

(54) METHOD FOR TRANSMITTING REFERENCE SIGNAL IN CELL THAT USES UNLICENSED FREQUENCY BAND AND DEVICE

(71) Applicant: Huawei Technologies Co., Ltd., Shenzhen (CN)

(72) Inventors: Lei Guan, Beijing (CN); David Jean-Marie Mazzarese, Beijing (CN); Brian Classon, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/209,777

(22) Filed: Dec. 4, 2018

(65) Prior Publication Data

US 2019/0109607 A1 Apr. 11, 2019

Related U.S. Application Data

(63) Continuation of application No. 15/637,781, filed on Jun. 29, 2017, now Pat. No. 10,171,118, which is a
(Continued)

(51) Int. Cl.
*H04B 1/10* (2006.01)
*H04W 16/10* (2009.01)
(Continued)

(52) U.S. Cl.
CPC ........... *H04B 1/10* (2013.01); *H04B 17/3913* (2015.01); *H04L 5/001* (2013.01); *H04W 4/12* (2013.01);
(Continued)

(58) Field of Classification Search
CPC ..... H04B 17/3913; H04B 1/10; H04L 5/0007; H04L 5/001; H04L 5/0039; H04W 16/10;
(Continued)

(56) References Cited

U.S. PATENT DOCUMENTS

2003/0091066 A1 5/2003 Choi et al.
2013/0176877 A1 7/2013 Sadek et al.
(Continued)

FOREIGN PATENT DOCUMENTS

CN 102232307 A 11/2011
CN 103517456 A 1/2014
(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 12), 3GPP TS 36.211, V12.3.0, Sep. 2014, 124 pages.
(Continued)

*Primary Examiner* — Shaima Q Aminzay
(74) *Attorney, Agent, or Firm* — Slater Matsil, LLP

(57) ABSTRACT

A system and method for transmitting a reference signal in a cell that uses an unlicensed frequency band. The method includes determining a candidate resource set that is used when a first reference signal is transmitted in the cell that uses the unlicensed frequency band, where the candidate resource set includes a preset resource and at least one flexible candidate resource, determining a first candidate resource that is used when the first reference signal is transmitted in the cell that uses the unlicensed frequency band, where a channel on the unlicensed frequency band corresponding to the first candidate resource is in an idle state, and the first candidate resource is the preset resource or a flexible candidate resource in the candidate resource set, and sending the first reference signal on the first candidate resource.

20 Claims, 5 Drawing Sheets

Related U.S. Application Data continuation of application No. PCT/CN2014/095851, filed on Dec. 31, 2014.

(51) Int. Cl.

| | |
|---|---|
| *H04B 17/391* | (2015.01) |
| *H04L 5/00* | (2006.01) |
| *H04W 4/12* | (2009.01) |
| *H04W 16/14* | (2009.01) |
| *H04W 28/18* | (2009.01) |
| *H04W 48/16* | (2009.01) |
| *H04W 72/04* | (2009.01) |
| *H04W 72/08* | (2009.01) |

(52) U.S. Cl.
CPC ........... *H04W 16/10* (2013.01); *H04W 16/14* (2013.01); *H04W 28/18* (2013.01); *H04W 48/16* (2013.01); *H04W 72/0453* (2013.01); *H04W 72/085* (2013.01)

(58) Field of Classification Search
CPC ..... H04W 16/14; H04W 28/18; H04W 48/16; H04W 4/12
USPC ...................................................... 455/63.1
See application file for complete search history.

(56) References Cited

U.S. PATENT DOCUMENTS

| | | | |
|---|---|---|---|
| 2014/0078970 A1 | 3/2014 | Guo et al. | |
| 2014/0120975 A1 | 5/2014 | Liu et al. | |
| 2014/0302865 A1 | 10/2014 | Bai et al. | |
| 2014/0341035 A1 | 11/2014 | Bhushan et al. | |
| 2015/0009962 A1 | 1/2015 | Clegg | |
| 2015/0110056 A1 | 4/2015 | Wang et al. | |
| 2015/0131536 A1 | 5/2015 | Kaur et al. | |
| 2016/0066322 A1 | 3/2016 | Bontu et al. | |
| 2016/0127098 A1 | 5/2016 | Ng et al. | |
| 2016/0143014 A1* | 5/2016 | Mukherjee | H04W 74/0816 370/330 |

FOREIGN PATENT DOCUMENTS

| | | |
|---|---|---|
| CN | 103580840 A | 2/2014 |
| CN | 103916903 A | 7/2014 |
| CN | 103916969 A | 7/2014 |
| CN | 103945538 A | 7/2014 |
| CN | 104115517 A | 10/2014 |
| CN | 107079464 A | 8/2017 |
| EP | 1333620 A2 | 8/2003 |
| EP | 1449329 A1 | 8/2004 |
| EP | 2811790 A1 | 12/2014 |
| JP | 2014500685 A | 1/2014 |
| WO | 2013010323 A1 | 1/2013 |
| WO | 2013071506 A | 5/2013 |

OTHER PUBLICATIONS

3rd Generation Partnership Project; Technical Specification Group Radio Access Network; Evolved Universal Terrestrial Radio Access (E-UTRA); Physical Layer Procedures (Release 12), 3GPP TS 36.213 V12.3.0, Sep. 2014, 2012 pages.
3rd Generation Partnership Project; Technical Specification Group Radio Access Network; Evolved Universal Terrestrial Radio Access (E-UTRA); Radio Resource Control (RCC); Protocol Specification (Release 12), 3GPP TS 36.331 V12.3.0, Sep. 2014, 378 pages.
"Listen Before Talk for LAA," Source: CATT, Agenda Item: 6.3.2.2, Document for: Discussion/Decision, 3GPP TSG RAN WG1 Meeting #79, R1-144625, Nov. 17-21, 2014, 6 pages.
"Discussion on PHY layer options for LAA using LTE," Agenda item: 6.3.2.2, Source: Intel Corporation, Document for: Discussion and Decision, 3GPP TSG RAN WG1 Meeting #79, R1-144666, San Francisco, USA, Nov. 17th-21st, 2014, 6 pages.
"Discussion on LAA Synchronization and Discovery," Source: Panasonic, Agenda Item: 6.3.2.2, Document for: Discussion/Decision, 3GPP TSG-RAN WG1 Meeting 79, R1-144801, Nov. 17-21, 2014, 4 pages.
"Impact of LBT regulation on LAA," Agenda Item: 6.3.2.2, Source: NEC, Document for: Discussion, 3GPP TSG RAN WG1 Meeting #79, R1-144866, San Francisco, USA, Nov. 17th-21st, 2014, 2 pages.
"LBT operation details and initial evaluation results," Agenda Item: 6.3.2.2, Source: LG Electronics, Document for: Discussion and decision, 3GPP TSG RAN WG1 Meeting #79, R1-144900, San Francisco, USA, Nov. 17th-21st, 2014, 7 pages.
"Measurement and synchronization in LAA," Source: LG Electronics, Agenda Item: 6.3.2.2, Document for: Discussion and Decision, 3GPP TSG RAN WG1 Meeting #79, R1-144903, San Francisco, USA, Nov. 17th-21st, 2014, 4 pages.
"Required functionalities and possible solution related to SCE operation in unlicensed carrier," Source: ETRI, Agenda item: 6.3.2.2, Document for: Discussion and Decision, 3GPP TSG RAN WG1 Meeting #79, R1-14492, San Francisco, USA, Nov. 17th-21st, 2014, 8 pages.
"Further Considerations on the Essential Functionalities for LAA," Source: Kyocera, Agenda Item: 6.3.2.2, Document for: Discussion/Decision, 3GPP TSG RAN WG1 Meeting #79, R1-144955, Nov. 17-21, 2014, 10 pages.
"Views on issues related to LAA UL," Source: NTT DOCOMO, Agenda Item: 6.3.2.2, Document for: Discussion and Decision, 3GPP TSG RAN WG1 Meeting #79, R1-144970, San Francisco, USA, Nov. 17th-21st, 2014, 4 pages.
"On L1 design for LTE LAA DL only mode," Agenda Item: 6.3.2.2, Source: InterDigital Communications, Document for: Discussion and Decision, 3GPP TSG-RAN WG1#79, R1-145052, San Francisco, USA, Nov. 17th-21st, 2014, 5 pages.
"The on/off State Indication of SCell in LAA Unlicensed Carrier for DL Measurement," Agenda Item: 6.3.2.2, Source: ITL Inc., Document for: Discussion/Decision, 3GPP TSG RAN WG1 Meeting #79, R1-145110, Nov. 17-21, 2014, 3 pages.
"Further analysis on the required functionalities for LAA," Agenda Item: 6.3.2.2, Source: Huawei, HiSilicon, Document for Discussion/Decision, 3GPP TSG RAN WG1 Meeting #79, R1-144590, San Francisco, USA, Nov. 17-21, 2014, 4 pages.
"DL data and CRS transmission for LAA," Agenda Item: 6.3.2.2, Source: Fujitsu, Document for: Discussion/Decision, 3GPP TSG RAN WG1 Meeting #79, R1-144785, San Francisco, USA, 17th-21st Nov. 2014, 8 pages.
"PHY Enhancement Areas & Options to Support Robust Coexistence LAA," Agenda Item: 7.3.2.3, Source: Broadcom Corporation, CableLabs, Document for: Discussion and Decision, R1-144233, 3GPP TSG-RAN WG1 Meeting #78bis, Ljubljana, Slovenia, Oct. 6th-10th, 2014, 3 pages.
"Draft Standard for Telecommunications and Information Exchange Between Systems—LAN/MAN Specific Requirements—Part 15.3: Wireless Medium Access Control (MAC) and Physical Layer (PHY) Specifications for High Rate Wireless Personal Area Networks (WPAN),"Draft P802.15.3/D17, XP-002294149, Feb. 2003, 160 pages.

\* cited by examiner

METHOD FOR TRANSMITTING REFERENCE SIGNAL IN CELL THAT USES UNLICENSED FREQUENCY BAND AND DEVICE

CROSS-REFERENCE TO RELATED APPLICATIONS

This application is a continuation of U.S. patent application Ser. No. 15/637,781, filed on Jun. 29, 2017, which is a continuation of International Application No. PCT/CN2014/095851, filed on Dec. 31, 2014. All of the afore-mentioned patent applications are hereby incorporated by reference in their entireties.

TECHNICAL FIELD

Embodiments of the present invention relate to the communications field, and more specifically, to a method for transmitting a reference signal in a cell that uses an unlicensed frequency band and a device.

BACKGROUND

When cell selection, reselection, or handover is performed, user equipment (UE) needs to perform cell synchronization and identification, channel state information (CSI) measurement, and radio resource management (RRM) measurement according to a reference signal that is sent by a base station. The cell synchronization includes initial coarse synchronization and time-frequency track fine synchronization. Specifically, the UE may complete the initial coarse synchronization according to a primary synchronization signal (PSS) and a secondary synchronization signal (SSS) that are periodically sent by the base station, and complete the time-frequency track fine synchronization according to a cell-specific reference signal (CRS) that is periodically sent by the base station. The CSI measurement includes channel measurement and interference measurement. The UE may perform the channel measurement and the interference measurement according to the CRS or a channel state information-reference signal (CSI-RS) that is sent by the base station. The RRM measurement includes reference signal received power (RSRP) measurement, reference signal received quality (RSRQ) measurement, and received signal strength indicator (RSSI) measurement, and the like. The UE may complete the RRM measurement according to the CRS that is periodically sent by the base station.

However, in a communications system that uses an unlicensed spectrum, when communication is performed by using the unlicensed spectrum, a specific coexistence specification needs to be met, for example, the Listen-Before-Talk (LBT) specification. Specifically, before sending a signal on a channel that is corresponding to the unlicensed spectrum, the base station needs to perform clear channel assessment (CCA) on the channel. If detected receive power exceeds a preset threshold, it is considered that the channel is busy, and the base station cannot send a signal on the channel in this case. The base station can send a signal on the channel only when it is detected that the channel is idle.

Therefore, due to limitations of the LBT specification, a periodic sending feature of reference signals such as the PSS, the SSS, the CRS, and the CSI-RS is affected. For example, at a sending opportunity within a preset period, the base station may detect that the channel is busy, and consequently cannot send a reference signal at one or more sending opportunities. This affects cell synchronization and CSI measurement that are performed by UE, and further affects mobility performance of the UE. In this case, how to send a reference signal in the communications system that uses an unlicensed spectrum, to meet requirements for cell synchronization and CSI measurement is a problem to be resolved urgently.

SUMMARY

Embodiments of the present invention provide a method for transmitting a reference signal in a cell that uses an unlicensed frequency band and a device, which can improve a success rate of sending the reference signal in the cell that uses the unlicensed frequency band.

According to a first aspect, an embodiment of the present invention provides a method for transmitting a reference signal in a cell that uses an unlicensed frequency band, including determining a candidate resource set that is used when a first reference signal is transmitted in the cell that uses the unlicensed frequency band, where the candidate resource set includes a preset resource and at least one flexible candidate resource, the preset resource is a resource that is in a time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period, determining a first candidate resource that is used when the first reference signal is transmitted in the cell that uses the unlicensed frequency band, where a channel on the unlicensed frequency band corresponding to the first candidate resource is in an idle state, and the first candidate resource is the preset resource or a flexible candidate resource in the candidate resource set, and sending the first reference signal on the first candidate resource.

With reference to the first aspect, in a first implementation manner of the first aspect, the determining a first candidate resource that is used when the first reference signal is transmitted in the cell that uses the unlicensed frequency band, where a channel on the unlicensed frequency band corresponding to the first candidate resource is in an idle state includes starting clear channel assessment (CCA) on the unlicensed frequency band at a preset time interval before the first candidate resource to obtain a result of the CCA, and determining, according to the result of the CCA, that the channel on the unlicensed frequency band corresponding to the first candidate resource is in the idle state.

With reference to the first aspect and the foregoing implementation manner of the first aspect, in a second implementation manner of the first aspect, the determining, according to the result of the CCA, that the channel on the unlicensed frequency band corresponding to the first candidate resource is in the idle state includes when the result of the CCA indicates that the channel is idle, determining that the channel on the unlicensed frequency band corresponding to the first candidate resource is in the idle state, or, when the result of the CCA indicates that the channel is idle, performing random backoff, and when the channel is still idle within a time period of the random backoff, determining that the channel on the unlicensed frequency band corresponding to the first candidate resource is in the idle state.

With reference to the first aspect and the foregoing implementation manners of the first aspect, in a third implementation manner of the first aspect, the sending the first reference signal on the first candidate resource includes if it is determined that a moment when the channel is in the idle state is the same as a start moment of the first candidate resource, sending the first reference signal on the first candidate resource, or if it is determined that a moment when the channel is in the idle state is earlier than a start moment of the first candidate resource, sending a fill-in signal to occupy the channel until the start moment of the first candidate resource, and then starting to send the first reference signal on the first candidate resource.

With reference to the first aspect and the foregoing implementation manners of the first aspect, in a fourth implementation manner of the first aspect, the first reference signal includes a reference signal used for cell synchronization, and after the sending the first reference signal on the first candidate resource, the method further includes when the first candidate resource occupies a corresponding quantity of last symbols of a timeslot, sending a second reference signal at the beginning of a next timeslot when the first candidate resource ends, where the second reference signal includes one or more of a cell-specific reference signal (CRS), a channel state information-reference signal (CSI-RS), or a positioning reference signal (PRS).

With reference to the first aspect and the foregoing implementation manners of the first aspect, in a fifth implementation manner of the first aspect, the first reference signal includes a reference signal used for cell synchronization, and after the sending the first reference signal on the first candidate resource, the method further includes when the first candidate resource does not occupy a corresponding quantity of last symbols of a timeslot, sending, when the first candidate resource ends, a fill-in signal until the timeslot ends, and sending a second reference signal at the beginning of a next timeslot, where the second reference signal includes one or more of a cell-specific reference signal CRS, a channel state information-reference signal CSI-RS, or a positioning reference signal PRS.

With reference to the first aspect and the foregoing implementation manners of the first aspect, in a sixth implementation manner of the first aspect, the flexible candidate resource is a resource that is obtained after the preset resource is translated forward or backward in terms of time.

With reference to the first aspect and the foregoing implementation manners of the first aspect, in a seventh implementation manner of the first aspect, a granularity of the translation in terms of time is one or more timeslots.

With reference to the first aspect and the foregoing implementation manners of the first aspect, in an eighth implementation manner of the first aspect, the flexible candidate resource occupies a corresponding quantity of last symbols of a timeslot in the time window.

With reference to the first aspect and the foregoing implementation manners of the first aspect, in a ninth implementation manner of the first aspect, the time window is the same as a time window in which a flexible candidate resource used by a neighboring cell of a same frequency to send the first reference signal is located.

According to a second aspect, an embodiment of the present invention provides a method for transmitting a reference signal in a cell that uses an unlicensed frequency band, including determining a time window in which a candidate resource set, used when a first reference signal is transmitted in the cell that uses the unlicensed frequency band, is located, where the candidate resource set includes a preset resource and at least one flexible candidate resource, the preset resource is a resource that is in the time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period, and detecting the first reference signal on the unlicensed frequency band in the time window.

With reference to the second aspect, in a first implementation manner of the second aspect, the first reference signal includes a reference signal used for cell synchronization, and after the detecting the first reference signal on the unlicensed frequency band, the method further includes, if the first reference signal is successfully detected, detecting a second reference signal on the unlicensed frequency band, where in terms of time, a transmission resource occupied by the second reference signal is later than a transmission resource occupied by the first reference signal, and the second reference signal includes one or more of a cell-specific reference signal (CRS), a channel state information-reference signal (CSI-RS), or a positioning reference signal (PRS).

With reference to the second aspect and the foregoing implementation manner of the second aspect, in a second implementation manner of the second aspect, before the determining a time window in which a candidate resource set, used when a first reference signal is transmitted in the cell that uses the unlicensed frequency band, is located, the method further includes, receiving Radio Resource Control (RRC) signaling sent by a base station, where the RRC signaling carries a length and an emerging period of the time window.

With reference to the second aspect and the foregoing implementation manners of the second aspect, in a third implementation manner of the second aspect, the flexible candidate resource is a resource that is obtained after the preset resource is translated forward or backward in terms of time.

With reference to the second aspect and the foregoing implementation manners of the second aspect, in a fourth implementation manner of the second aspect, a granularity of the translation in terms of time is one or more timeslots.

With reference to the second aspect and the foregoing implementation manners of the second aspect, in a fifth implementation manner of the second aspect, the flexible candidate resource occupies a corresponding quantity of last symbols of a timeslot in the time window.

With reference to the second aspect and the foregoing implementation manners of the second aspect, in a sixth implementation manner of the second aspect, the time window is the same as a time window in which a flexible candidate resource used by a neighboring cell of a same frequency to send the first reference signal is located.

According to a third aspect, an embodiment of the present invention provides a base station, including a first determining unit, configured to determine a candidate resource set that is used when a first reference signal is transmitted in a cell that uses an unlicensed frequency band, where the candidate resource set includes a preset resource and at least one flexible candidate resource, the preset resource is a resource that is in a time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period, a second determining unit, configured to determine a first candidate resource that is used when the first reference signal is transmitted in the cell that uses the unlicensed frequency band, where a channel on the unlicensed frequency band corresponding to the first candidate resource is in an idle state, and the first candidate resource is the preset resource or a flexible candidate resource in the candidate resource set, and a sending unit, configured to send the first reference signal on the first candidate resource.

With reference to the third aspect, in a first implementation manner of the third aspect, the second determining unit is specifically configured to start clear channel assessment CCA on the unlicensed frequency band at a preset time interval before the first candidate resource to obtain a result of the CCA, and determine, according to the result of the CCA, that the channel on the unlicensed frequency band corresponding to the first candidate resource is in the idle state.

With reference to the third aspect and the foregoing implementation manner of the third aspect, in a second implementation manner of the third aspect, the second determining unit is specifically configured to when the result of the CCA indicates that the channel is idle, determine that the channel on the unlicensed frequency band corresponding to the first candidate resource is in the idle state, or, when the result of the CCA indicates that the channel is idle, perform random backoff, and when the channel is still idle within a time period of the random backoff, determine that the channel on the unlicensed frequency band corresponding to the first candidate resource is in the idle state.

With reference to the third aspect and the foregoing implementation manners of the third aspect, in a third implementation manner of the third aspect, the sending unit is specifically configured to, if it is determined that a moment when the channel is in the idle state is the same as a start moment of the first candidate resource, send the first reference signal on the first candidate resource, or, if it is determined that a moment when the channel is in the idle state is earlier than a start moment of the first candidate resource, send a fill-in signal to occupy the channel until the start moment of the first candidate resource, and then starting to send the first reference signal on the first candidate resource.

With reference to the third aspect and the foregoing implementation manners of the third aspect, in a fourth implementation manner of the third aspect, the first reference signal includes a reference signal used for cell synchronization, and the sending unit is further configured to, when the first candidate resource occupies a corresponding quantity of last symbols of a timeslot, send a second reference signal at the beginning of a next timeslot when the first candidate resource ends, where the second reference signal includes one or more of a cell-specific reference signal (CRS), a channel state information-reference signal (CSI-RS), or a positioning reference signal (PRS).

With reference to the third aspect and the foregoing implementation manners of the third aspect, in a fifth implementation manner of the third aspect, the first reference signal includes a reference signal used for cell synchronization, and the sending unit is further configured to when the first candidate resource does not occupy a corresponding quantity of last symbols of a timeslot, send, when the first candidate resource ends, a fill-in signal until the timeslot ends, and send a second reference signal at the beginning of a next timeslot, where the second reference signal includes one or more of a cell-specific reference signal CRS, a channel state information-reference signal CSI-RS, or a positioning reference signal PRS.

With reference to the third aspect and the foregoing implementation manners of the third aspect, in a sixth implementation manner of the third aspect, the flexible candidate resource is a resource that is obtained after the preset resource is translated forward or backward in terms of time.

With reference to the third aspect and the foregoing implementation manners of the third aspect, in a seventh implementation manner of the third aspect, a granularity of the translation in terms of time is one or more timeslots.

With reference to the third aspect and the foregoing implementation manners of the third aspect, in an eighth implementation manner of the third aspect, the flexible candidate resource occupies a corresponding quantity of last symbols of a timeslot in the time window.

With reference to the third aspect and the foregoing implementation manners of the third aspect, in a ninth implementation manner of the third aspect, the time window is the same as a time window in which a flexible candidate resource used by a neighboring cell of a same frequency to send the first reference signal is located.

According to a fourth aspect, an embodiment of the present invention provides user equipment, including a determining unit, configured to determine a time window in which a candidate resource set, used when a first reference signal is transmitted in a cell that uses an unlicensed frequency band, is located, where the candidate resource set includes a preset resource and at least one flexible candidate resource, the preset resource is a resource that is in the time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period, and a detection unit, configured to detect the first reference signal on the unlicensed frequency band in the time window.

With reference to the fourth aspect, in a first implementation manner of the fourth aspect, the first reference signal includes a reference signal used for cell synchronization, and the detection unit is further configured to, if the first reference signal is successfully detected, detect a second reference signal on the unlicensed frequency band, where in terms of time, a transmission resource occupied by the second reference signal is later than a transmission resource occupied by the first reference signal, and the second reference signal includes one or more of a cell-specific reference signal CRS, a channel state information-reference signal CSI-RS, or a positioning reference signal PRS.

With reference to the fourth aspect and the foregoing implementation manner of the fourth aspect, in a second implementation manner of the fourth aspect, a base station further includes a receiving unit, configured to receive Radio Resource Control RRC signaling sent by the base station, where the RRC signaling carries a length and an emerging period of the time window.

With reference to the fourth aspect and the foregoing implementation manners of the fourth aspect, in a third implementation manner of the fourth aspect, the flexible candidate resource is a resource that is obtained after the preset resource is translated forward or backward in terms of time.

With reference to the fourth aspect and the foregoing implementation manners of the fourth aspect, in a fourth implementation manner of the fourth aspect, a granularity of the translation in terms of time is one or more timeslots.

With reference to the fourth aspect and the foregoing implementation manners of the fourth aspect, in a fifth implementation manner of the fourth aspect, the flexible candidate resource occupies a corresponding quantity of last symbols of a timeslot in the time window.

With reference to the fourth aspect and the foregoing implementation manners of the fourth aspect, in a sixth implementation manner of the fourth aspect, the time window is the same as a time window in which a flexible candidate resource used by a neighboring cell of a same frequency to send the first reference signal is located.

Based on the foregoing technical solutions, in the embodiments of the present invention, a candidate resource set is determined for sending a reference signal, so as to increase a sending opportunity of the reference signal. Therefore, according to the embodiments of the present invention, a success rate of sending the reference signal can be improved without affecting normal system communication.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
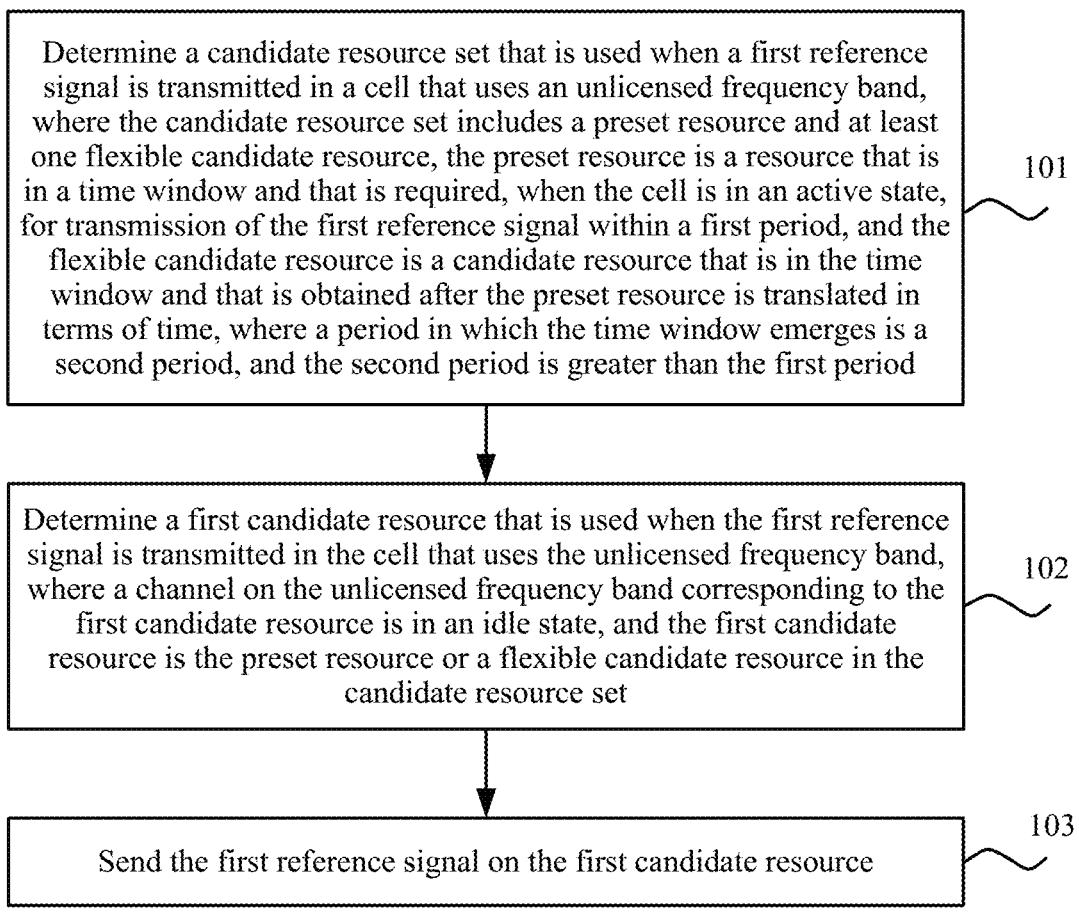
FIG. 1 is a schematic flowchart of a method for transmitting a reference signal in a cell that uses an unlicensed frequency band according to an embodiment.

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that in the embodiments of the present invention, user equipment (UE) may be referred to as a terminal, a mobile station (MS), a mobile terminal, or the like. The user equipment may communicate with one or more core networks by using a radio access network (RAN). For example, the user equipment may be a mobile phone (also referred to as a "cellular" phone) or a computer with a mobile terminal. For example, the user equipment may alternatively be a portable, pocket-sized, handheld, computer built-in, or in-vehicle mobile apparatus, which exchanges voice and/or data with the radio access network.

In the embodiments of the present invention, a base station may be an evolved NodeB (Evolutional Node B, ENB, or e-NodeB) in long term evolution (LTE), and is not limited in the present invention. However, for ease of description, the following embodiments use a base station ENB and UE as an example for description.

In an actual scenario, to enable user equipment in a local cell to normally obtain time-frequency synchronization information, channel estimation information, and the like, a base station sends a reference signal according to a preset period, and corresponding user equipment in the local cell detects the reference signal in this preset period and obtains the time-frequency synchronization information, the channel estimation information, and the like according to the detected reference signal. In the embodiments of the present invention, this preset period is referred to as a first period, and a resource that is in the first period and that is used to send the reference signal is referred to as a preset resource.

When the base station transmits a signal in a cell of an unlicensed frequency band, in consideration of introduction of a contention mechanism, it is difficult to ensure that in each preset resource, the base station is allowed to occupy a channel of the cell of the unlicensed frequency band. An opportunity for the base station to send the reference signal in the cell of the unlicensed frequency band decreases. As a result, it is difficult for user equipment in the local cell or in a neighboring cell to obtain necessary information such as time-frequency synchronization information and channel measurement information in time, thereby affecting communication quality.

To increase an opportunity for the base station to send the reference signal in the cell of the unlicensed frequency band, the embodiments of the present invention propose a method for transmitting a reference signal in the cell that uses the unlicensed frequency band. On the basis of attempting to send the reference signal on the preset resource according to the first period in the prior art, a flexible candidate resource is further set in a time window whose emerging period is a second period, to serve as a candidate resource for sending the reference signal.

FIG. 1 is a schematic flowchart of a method for transmitting a reference signal in a cell that uses an unlicensed frequency band according to an embodiment of the present invention. The method shown in FIG. 1 may be executed by a base station, where the method includes the following.

101. Determine a candidate resource set that is used when a first reference signal is transmitted in the cell that uses the unlicensed frequency band, where the candidate resource set includes a preset resource and at least one flexible candidate resource, the preset resource is a resource that is in a time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period.

It should be understood that a cell in an active state is a concept relative to a cell in a dormant state. A cell in an active state sends a reference signal to UE more frequently, while a cell in a dormant state sends a reference signal less frequently. For example, the cell in the active state sends a primary synchronization signal/secondary synchronization signal (PSS/SSS) signal once every 5 ms, while the cell in the dormant state sends a PSS/SSS signal once every 40 ms or 80 ms.

For example, a system using an unlicensed frequency band to perform communication includes an LTE system (U-LTE) deployed on the unlicensed frequency band, a wireless local area network (WLAN) system, and the like. For example, to improve a service capability, generally carrier aggregation is performed on a U-LTE serving cell and a primary serving cell to serve UE, where the U-LTE serving cell is used as a secondary serving cell and deployed on an unlicensed spectrum, and the primary serving cell is deployed on a licensed spectrum.

When providing a service for the UE, a secondary serving cell that uses the unlicensed frequency band generally needs to send some reference signals to the UE for cell identification, cell synchronization, channel measurement, interference measurement, and the like. However, during a process of sending a reference signal to the UE by occupying, according to a preset period, the preset resource, due to limitations of the Listen-Before-Talk (LBT) specification, sending of the reference signal cannot be completed when a channel is occupied.

According to the method in this embodiment of the present invention, determining the candidate resource set for sending the reference signal increases a sending opportunity of the reference signal, which can further improve a success rate of sending the reference signal. The candidate resource set includes the preset resource and the at least one flexible candidate resource. The flexible candidate resource and the preset resource use a same frequency, which means that the flexible candidate resource is a resource that is obtained after the preset resource is translated in terms of time. In addition, the flexible candidate resource also needs to fall within the time window that emerges periodically.

Specifically, the second period in which the time window emerges is greater than the preset first period for sending the reference signal. For example, the first period may be 5 ms, and the second period is 40 ms or 80 ms. It should be understood that these examples are merely intended to help a person skilled in the art better understand this embodiment of the present invention, but not to limit the scope of this embodiment of the present invention. A length of the time window may be determined with reference to a status such as a channel busyness level, which is not limited in this embodiment of the present invention.

102. Determine a first candidate resource that is used when the first reference signal is transmitted in the cell that uses the unlicensed frequency band, where a channel on the unlicensed frequency band corresponding to the first candidate resource is in an idle state, and the first candidate resource is the preset resource or a flexible candidate resource in the candidate resource set.

103. Send the first reference signal on the first candidate resource.

For example, a channel busy/idle state of the preset resource and the flexible candidate resource may be determined in chronological order. It is assumed that there are totally three resources available for sending the reference signal this time, and an emerging sequence of these three resources in terms of time is: a first flexible candidate resource, the preset resource, and a second flexible candidate resource.

Therefore, whether a channel on the first flexible candidate resource is idle may be determined first, and if the channel is idle, the reference signal is sent on the first flexible candidate resource (in this case, the first flexible candidate resource is the first candidate resource). Conversely, if the channel on the first flexible candidate resource is busy, whether a channel on the preset resource is idle needs to be further determined, and if the channel is idle, the reference signal is sent on the preset resource. Conversely, if the channel on the preset resource is busy, whether a channel on the second flexible candidate resource is idle needs to be further determined, and if the channel is idle, the reference signal is sent on the second flexible candidate resource (in this case, the second flexible candidate resource is the first candidate resource). Conversely, if the channel on the second flexible candidate resource is busy, the first reference signal cannot be sent on the second flexible candidate resource, that is, sending of the first reference signal this time fails.

Based on the foregoing technical solutions, in this embodiment of the present invention, a candidate resource set is determined for sending a reference signal, so as to increase a sending opportunity of the reference signal. Therefore, according to this embodiment of the present invention, a success rate of sending the reference signal can be improved without affecting normal system communication.

Further, when the reference signal is sent in a communications system that uses the unlicensed spectrum, the solutions provided in this embodiment of the present invention can meet requirements for cell synchronization and channel state information (CSI) measurement, and further ensure demodulation and mobility performance of the UE.

In addition, a mainstream deployment scenario of this embodiment of the present invention is to perform carrier aggregation on the primary serving cell on the licensed spectrum and the U-LTE secondary serving cell on the unlicensed spectrum for use. The LTE primary serving cell and the U-LTE secondary serving cell may be deployed at a same site, or may be deployed at different sites, and there is an ideal backhaul path between the two serving cells.

Alternatively, in the present invention, deployment may be performed in a scenario in which there is no ideal backhaul path between the two serving cells, for example, a backhaul delay is relatively high, and consequently, information cannot be coordinated quickly between the two serving cells. In addition, a U-LTE serving cell that may be independently accessed may also be deployed in this embodiment of the present invention, that is, carrier aggregation does not need to be performed on the U-LTE serving cell and the LTE serving cell in this case. Examples of the foregoing application scenarios are merely intended to help a person skilled in the art better understand this embodiment of the present invention, but not to limit the scope of this embodiment of the present invention.

Optionally, in an embodiment, when the first candidate resource that is used when the first reference signal is transmitted in the cell that uses the unlicensed frequency band is determined, clear channel assessment (CCA) on the unlicensed frequency band is started at a preset time interval before the first candidate resource, to obtain a result of the CCA. Then, it is determined, according to the result of the CCA, that the channel on the unlicensed frequency band corresponding to the first candidate resource is in the idle state.

Optionally, in an embodiment, when the result of the CCA indicates that the channel is idle, it is determined that the channel on the unlicensed frequency band corresponding to the first candidate resource is in the idle state; or when the result of the CCA indicates that the channel is idle, random backoff is performed, and when the channel is still idle within a time period of the random backoff, it is determined that the channel on the unlicensed frequency band corresponding to the first candidate resource is in the idle state.

Figure 2:
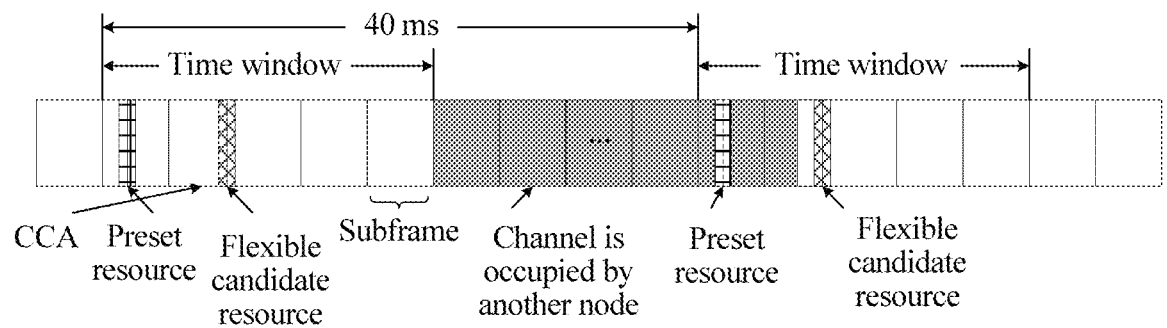
FIG. 2 is a schematic diagram of a candidate resource set according to an embodiment.

FIG. 2 is a schematic diagram of a candidate resource set according to an embodiment of the present invention. Specifically, as shown in FIG. 2, a time window emerges once at an interval of 40 ms. The time window includes a preset resource and at least one flexible candidate resource. A start moment of CCA may be at a preset time interval before a flexible candidate resource.

The preset resource is a resource that is used for sending a first reference signal when a sending period is 5 ms. That is, regardless of whether the cell is in the time window or out of the time window, the first reference signal is sent according to the preset period 5 ms. In addition, according to the method in this embodiment of the present invention, a flexible candidate resource is further provided for the cell, so as to increase a sending opportunity of the first reference signal.

Last two symbols (that is, a sixth symbol and a seventh symbol in a subframe, it is assumed that one subframe includes 14 symbols) of a first timeslot of a first subframe in the time window are the preset resource. The flexible candidate resource may be obtained after time domain translation is performed on the foregoing preset resource in the time window, where the translation herein may be forward or backward translation. FIG. 2 shows last two symbols (that is, a thirteenth symbol and a fourteenth symbol in a subframe) of a second subframe in the time window.

When the time domain translation is performed on the preset resource to obtain the flexible candidate resource, a specific time granularity of the translation may be a symbol level, a timeslot level, or a subframe level. For example, the symbol level means that one translation copy emerges every 4 symbols, the timeslot level means that one translation copy emerges every 7 symbols included in one timeslot, and the subframe level means that one translation copy emerges every 14 symbols included in one subframe.

It should be noted that these examples are merely intended to help a person skilled in the art better understand this embodiment of the present invention, but not to limit the scope of this embodiment of the present invention.

Therefore, when a result of the CCA indicates that a channel is idle, the first reference signal is sent directly on a first candidate resource but random backoff is not performed, which can improve a priority of sending a reference signal, and further improve a success rate of sending the reference signal.

Alternatively, when a result of the CCA indicates that a channel is idle, random backoff is first performed. The first reference signal is sent on a first candidate resource only when the channel is still idle within a time period of the random backoff. This can protect signal transmission of another communications device in a system, and prevent mutual interference between transmission of the reference signal of the cell and the signal transmission of the another communications device.

Optionally, a start point of starting the foregoing CCA may be a start moment of the first subframe in the time window, and in this case, the foregoing preset time interval is 5 symbols. Alternatively, the foregoing preset time interval may be a current maximum backoff time, for example, a length of a contention window in a backoff mechanism, which is specifically equal to a CCA unit time length multiplied by a maximum value of a value range of a backoff counter. It should be noted that these examples are merely intended to help a person skilled in the art better understand this embodiment of the present invention, but not to limit the scope of this embodiment of the present invention.

Optionally, in another embodiment, if it is determined that a moment when the channel is in the idle state is the same as a start moment of the first candidate resource, the first reference signal is sent on the first candidate resource.

That is, when it is determined, according to the result of the CCA, that the moment when the channel is idle is the same as the start moment of the first candidate resource, the reference signal may be sent directly on the first candidate resource. It should be understood that, the moment when the channel is idle being the same as the start moment of the first candidate resource does not mean strict consistency in digits, and it may be considered that the moment when a channel busy/idle state is determined as idle is the same as the start moment of the first candidate resource provided that a difference between the two is less than a preset threshold.

If it is determined that a moment when the channel is in the idle state is earlier than a start moment of the first candidate resource, a fill-in signal is sent to occupy the channel until the start moment of the first candidate resource, and then the first reference signal starts to be sent on the first candidate resource.

Optionally, in another embodiment, if the cell has performed CCA for data sending, and enters a random backoff process, the foregoing data is to be sent to the UE or to be sent to another UE. If during a random backoff process for data sending, the flexible candidate resource for sending the reference signal is reached, a random backoff counter is first suspended in this case, and the foregoing backoff counter for CCA for data sending is resumed only after the reference signal is entirely sent. Alternatively, during a random backoff process for data sending, if the start point of CCA started for sending the reference signal is reached, that is, at the preset time interval before the flexible candidate resource, the CCA for sending the reference signal may be first performed. At the same time, the backoff counter for CCA for data sending is temporarily suspended. Once the CCA for the reference signal succeeds, that is, the result of the CCA indicates that the channel is idle, the reference signal may be first sent. After the reference signal is sent, the foregoing suspended counter is resumed. Alternatively, during a random backoff process for data sending, if the start point of CCA started for sending the reference signal is reached, that is, at the preset time interval before the flexible candidate resource, CCA for data sending and the CCA for the reference signal sending may be performed at the same time. If the CCA for the reference signal first succeeds, the reference signal may be first sent; in this case, the backoff counter for the CCA for the data sending is suspended, and is resumed only after the reference signal is entirely sent. If the CCA for the data sending first succeeds, the data and the reference signal may be sent.

Optionally, in another embodiment, the first reference signal includes a reference signal used for cell synchronization. After the first reference signal is sent on the first candidate resource, when the first candidate resource occupies a corresponding quantity of last symbols of a timeslot, a second reference signal is sent at the beginning of a next timeslot when the first candidate resource ends.

Optionally, in another embodiment, when the first candidate resource does not occupy a corresponding quantity of last symbols of a timeslot, a fill-in signal is sent, when the first candidate resource ends, until the timeslot ends, and a second reference signal is sent at the beginning of a next timeslot.

The second reference signal includes one or more of a cell-specific reference signal CRS, a channel state information-reference signal CSI-RS, or a positioning reference signal PRS.

Figure 3:
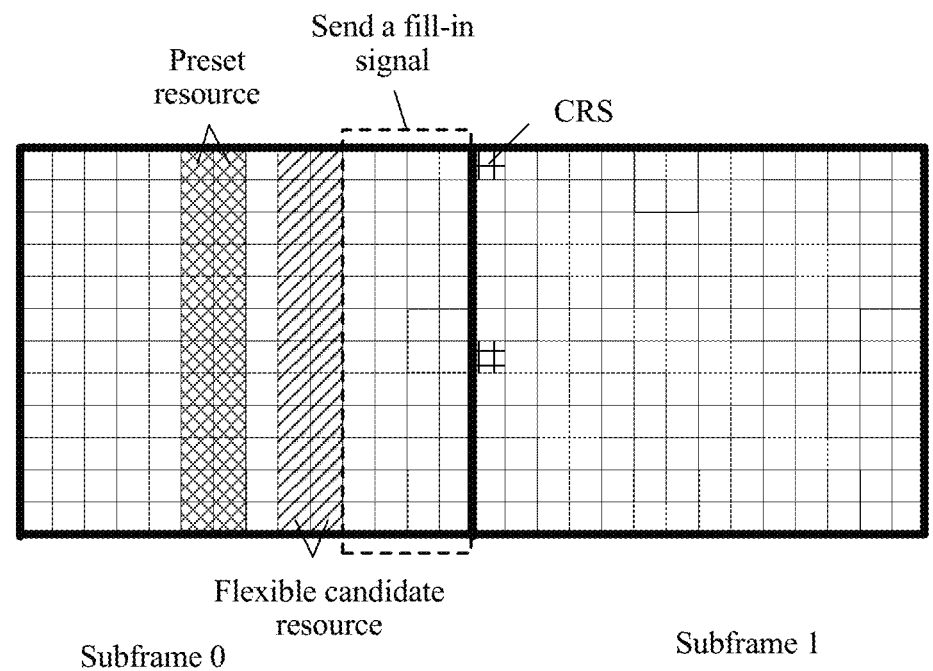
FIG. 3 is a schematic diagram of a time-frequency resource according to an embodiment.

For example, an example in which downlink transmission of a U-LTE system is based on an orthogonal frequency division multiplexing access (OFDMA) technology is used for description, where a time-frequency resource is divided into an OFDM symbol in a time domain dimension and an OFDM subcarrier in a frequency domain dimension. FIG. 3 is a schematic diagram of a time-frequency resource according to an embodiment of the present invention. As shown in FIG. 3, a minimum resource granularity is referred to as one resource element (RE), which indicates one OFDM symbol in a time domain and a time-frequency grid point of one OFDM subcarrier in a frequency domain.

As shown in FIG. 3, a preset resource is located at the end of the first timeslot of a subframe o. If a flexible candidate resource is not located at the end of a timeslot, and if the flexible candidate resource is successfully occupied to send a first reference signal, a fill-in signal needs to be first sent to occupy a channel, and then a CRS signal (the second reference signal) is sent at the beginning of a next timeslot. This can ensure that a pattern of downlink data does not change, and further avoid increasing UE detection complexity.

Alternatively, the flexible candidate resource is directly selected to be at the end of the timeslot, and then the CRS may be directly sent after the first reference signal is entirely sent, which can also ensure that a pattern of downlink data does not change and further avoid increasing UE detection complexity. In addition, system overheads may reduce because a fill-in signal does not need to be sent.

Optionally, the foregoing second reference signal may be different from a current CRS, for example, the second reference signal may be a CRS of consecutive N symbols, instead of a previous CRS that occupies discrete symbols. Specifically, symbols on which the CRS is located and that are in 14 symbols of one current subframe are symbols 0, 4, 7, and 11, and symbols on which a changed CRS is located may be symbols 7, 8, 9, and 10. It is assumed herein that a PSS/SSS is on symbols 5 and 6, and a CRS on each symbol may be at a same location as an original CRS on each symbol, or undergo frequency domain subcarrier shift. An advantage of the foregoing is that the channel may be continuously occupied, and the channel is not preempted by another strongly interfering node during this time. In addition, time domain resource overheads may further be reduced in comparison with an original solution for a CRS occupying non-consecutive symbols. Because the CRS occupies consecutive time domain symbols, signal detection performance may further be enhanced. In this case, sending the PSS/SSS may even be canceled, but instead, only the CRS is sent to perform cell identification and measurement.

Optionally, in another embodiment, the flexible candidate resource is a resource that is obtained after the preset resource is translated forward or backward in terms of time.

Optionally, in another embodiment, a granularity of the translation in terms of time is one or more timeslots.

Optionally, in another embodiment, the flexible candidate resource occupies a corresponding quantity of last symbols of a timeslot in a time window.

For example, assuming that the flexible candidate resource occupies two symbols in the time domain, the flexible candidate resource is a resource corresponding to last two symbols of a timeslot in the time window.

Optionally, in another embodiment, the time window is the same as a time window in which a flexible candidate resource used by a neighboring cell of a same frequency to send the first reference signal is located.

For example, multiple U-LTE secondary serving cells at a same frequency may select a same time window. That is, lengths and emerging periods of time windows of all U-LTE secondary serving cells are the same. Therefore, the UE may identify and measure all cells at the frequency as far as possible in the time window, which reduces UE measurement complexity and reduces power consumption of the UE. In addition, coordination between all the U-LTE secondary serving cells is also ensured.

Figure 4:
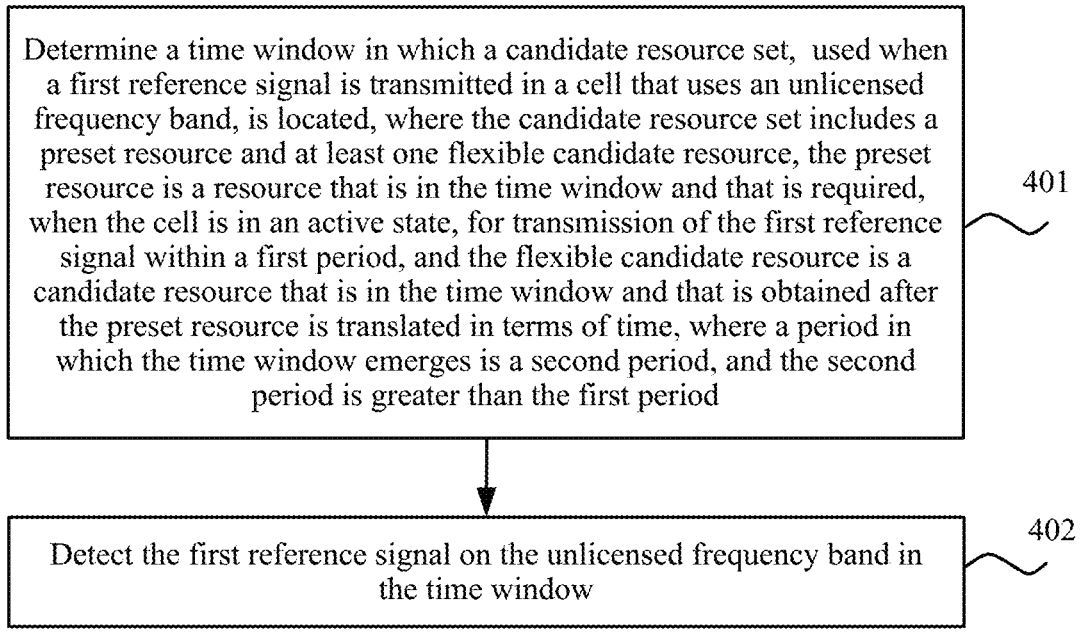
FIG. 4 is a schematic flowchart of a method for transmitting a reference signal in a cell that uses an unlicensed frequency band according to another embodiment.

FIG. 4 is a schematic flowchart of a method for transmitting a reference signal in a cell that uses an unlicensed frequency band according to another embodiment of the present invention. The method shown in FIG. 4 may be executed by UE, where the method includes the following.

401. Determine a time window in which a candidate resource set, used when a first reference signal is transmitted in the cell that uses the unlicensed frequency band, is located, where the candidate resource set includes a preset resource and at least one flexible candidate resource, the preset resource is a resource that is in the time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period.

For example, a system using an unlicensed frequency band to perform communication includes: an LTE system U-LTE deployed on the unlicensed frequency band, a WLAN system, and the like. For example, to improve a service capability, generally carrier aggregation is performed on a U-LTE serving cell and a primary serving cell to serve UE, where the U-LTE serving cell is used as a secondary serving cell and deployed on an unlicensed spectrum, and the primary serving cell is deployed on a licensed spectrum.

When providing a service for the UE, a secondary serving cell that uses the unlicensed frequency band generally needs to send some reference signals to the UE for cell identification, cell synchronization, channel measurement, interference measurement, and the like. However, during a process of sending a reference signal to the UE by occupying, according to a preset period, the preset resource, due to limitations of the LBT specification, sending of the reference signal cannot be completed when a channel is occupied.

According to the method in this embodiment of the present invention, determining the candidate resource set for sending the reference signal increases a sending opportunity of the reference signal, which can further improve a success rate of sending the reference signal. The candidate resource set includes the preset resource and the at least one flexible candidate resource. The flexible candidate resource and the preset resource use a same frequency, which means that the flexible candidate resource is a resource that is obtained after the preset resource is translated in terms of time. In addition, the flexible candidate resource also needs to fall within the time window that emerges periodically.

Specifically, the second period in which the time window emerges is greater than the preset first period for sending the reference signal. For example, the first period may be 5 ms, and the second period is 40 ms or 80 ms. It should be understood that these examples are merely intended to help a person skilled in the art better understand this embodiment of the present invention, but not to limit the scope of this embodiment of the present invention. A length of the time window may be determined with reference to a status such as a channel busyness level, which is not limited in this embodiment of the present invention.

Therefore, the UE may first determine the time window (such as a length and an emerging period of the time window) in which the flexible candidate resource is located, and may further learn time when the first reference signal needs to be detected.

402. Detect the first reference signal on the unlicensed frequency band in the time window.

For example, when multiple neighboring cells (such as U-LTE secondary serving cells) using a same frequency use a same time window, first reference signals sent by the multiple neighboring cells may be detected at the same time.

Based on the foregoing technical solutions, in this embodiment of the present invention, a candidate resource set is determined for sending a reference signal, so as to increase a sending opportunity of the reference signal. Therefore, according to this embodiment of the present invention, a success rate of sending the reference signal can be improved without affecting normal system communication.

Further, when the reference signal is sent in a communications system that uses the unlicensed spectrum, the solutions provided in this embodiment of the present invention can meet requirements for cell synchronization and CSI measurement, and further ensure demodulation and mobility performance of the UE.

In addition, a mainstream deployment scenario of this embodiment of the present invention is to perform carrier aggregation on the primary serving cell on the licensed spectrum and the U-LTE secondary serving cell on the unlicensed spectrum for use. The LTE primary serving cell and the U-LTE secondary serving cell may be deployed at a same site, or may be deployed at different sites, and there is an ideal backhaul path between the two serving cells.

Alternatively, in the present invention, deployment may be performed in a scenario in which there is no ideal backhaul path between the two serving cells, for example, a backhaul delay is relatively high, and consequently, information cannot be coordinated quickly between the two serving cells. In addition, a U-LTE serving cell that may be independently accessed may also be deployed in this embodiment of the present invention, that is, carrier aggregation does not need to be performed on the U-LTE serving cell and the LTE serving cell in this case. Examples of the foregoing application scenarios are merely intended to help a person skilled in the art better understand this embodiment of the present invention, but not to limit the scope of this embodiment of the present invention.

Optionally, in an embodiment, the first reference signal includes a reference signal used for cell synchronization. After the first reference signal is detected on the unlicensed frequency band, if the first reference signal is successfully detected, a second reference signal is detected on the unlicensed frequency band. In terms of time, a transmission resource occupied by the second reference signal is later than a transmission resource occupied by the first reference signal, and the second reference signal includes one or more of a cell-specific reference signal (CRS), a channel state information-reference signal (CSI-RS), or a positioning reference signal (PRS).

For example, before the first reference signal is successfully detected, the UE may assume that a base station does not send the second reference signal; therefore, the UE does not perform detection on or make other corresponding preparations for the second reference signal. The UE performs detection on the second reference signal only after the first reference signal is successfully detected.

It is assumed that the first reference signal is PSS/SSS. After detecting the PSS/SSS, the UE may determine, based on the PSS/SSS, a resource location of the second reference signal such as the CRS. Optionally, a flexible candidate resource of the PSS/SSS may be based on time domain translation at a timeslot level or a subframe level, that is, the flexible candidate resource of the PSS/SSS may be on last two symbols of a timeslot or a subframe. Therefore, it may be determined that the CRS after the PSS/SSS occupies an entire timeslot or subframe, and a resource location of the CRS in the timeslot or the subframe is not changed, which has no impact on normal data scheduling and sending of another reference signal. That is, the UE assumes that the second reference signal exists after the detected PSS/SSS, that is, it is assumed that the CRS does not exist before a time domain location of the detected PSS/SSS, which may prevent the UE from performing blind detection on existence of the CRS.

Optionally, in another embodiment, before the determining a time window in which a flexible candidate resource, used when the first reference signal is transmitted in the cell that uses the unlicensed frequency band, is located, Radio Resource Control (Radio Resource Control, RRC) signaling sent by a base station is received, where the RRC signaling carries a length and an emerging period of the time window.

Optionally, in another embodiment, the flexible candidate resource is a resource that is obtained after the preset resource is translated forward or backward in terms of time.

Optionally, in another embodiment, a granularity of the translation in terms of time is one or more timeslots.

Optionally, in another embodiment, the flexible candidate resource occupies a corresponding quantity of last symbols of a timeslot in the time window.

For example, assuming that the flexible candidate resource occupies two symbols in the time domain, the flexible candidate resource is a resource corresponding to last two symbols of a timeslot in the time window.

Optionally, in another embodiment, the time window is the same as a time window in which a flexible candidate resource used by a neighboring cell of a same frequency to send the first reference signal is located.

For example, multiple U-LTE secondary serving cells at a same frequency may select a same time window. That is, lengths and emerging periods of time windows of all U-LTE secondary serving cells are the same. Therefore, the UE may identify and measure all cells at the frequency as far as possible in the time window, which reduces UE measurement complexity and reduces power consumption of the UE. In addition, coordination between all the U-LTE secondary serving cells is also ensured.

Figure 5:
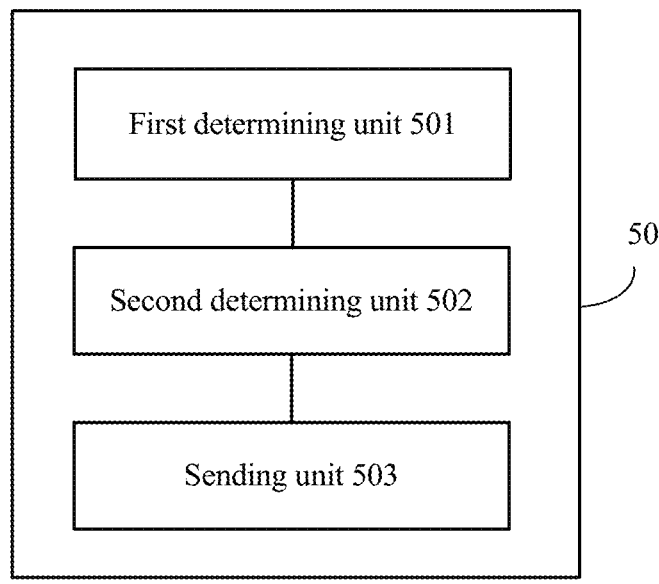
FIG. 5 is a schematic block diagram of a base station according to an embodiment.

FIG. 5 is a schematic block diagram of a base station according to an embodiment of the present invention. The base station shown in FIG. 5 includes a first determining unit 501, a second determining unit 502, and a sending unit 503.

The first determining unit 501 is configured to determine a candidate resource set that is used when a first reference signal is transmitted in a cell that uses an unlicensed frequency band, where the candidate resource set includes a preset resource and at least one flexible candidate resource, the preset resource is a resource that is in a time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period.

It should be understood that a cell in an active state is a concept relative to a cell in a dormant state. A cell in an active state sends a reference signal to UE more frequently, while a cell in a dormant state sends a reference signal less frequently. For example, the cell in the active state sends a PSS/SSS signal once every 5 ms, while the cell in the dormant state sends a PSS/SSS signal once every 40 ms or 80 ms.

For example, a system using an unlicensed frequency band to perform communication includes: an LTE system U-LTE deployed on the unlicensed frequency band, a wireless local area network (WLAN) system, and the like. For example, to improve a service capability, generally carrier aggregation is performed on a U-LTE serving cell and a primary serving cell to serve UE, where the U-LTE serving cell is used as a secondary serving cell and deployed on an unlicensed spectrum, and the primary serving cell is deployed on a licensed spectrum.

When providing a service for the UE, a secondary serving cell that uses the unlicensed frequency band generally needs to send some reference signals to the UE for cell identification, cell synchronization, channel measurement, interference measurement, and the like. However, during a process of sending a reference signal to the UE by occupying, according to a preset period, the preset resource, due to limitations of the LBT specification, sending of the reference signal cannot be completed when a channel is occupied.

According to the method in this embodiment of the present invention, determining the candidate resource set for sending the reference signal increases a sending opportunity of the reference signal, which can further improve a success rate of sending the reference signal. The candidate resource set includes the preset resource and the at least one flexible candidate resource. The flexible candidate resource and the preset resource use a same frequency, which means that the flexible candidate resource is a resource that is obtained after the preset resource is translated in terms of time. In addition, the flexible candidate resource also needs to fall within the time window that emerges periodically.

Specifically, the second period in which the time window emerges is greater than the preset first period for sending the reference signal. For example, the first period may be 5 ms, and the second period is 40 ms or 80 ms. It should be understood that these examples are merely intended to help a person skilled in the art better understand this embodiment of the present invention, but not to limit the scope of this embodiment of the present invention. A length of the time window may be determined with reference to a status such as a channel busyness level, which is not limited in this embodiment of the present invention.

The second determining unit 502 is configured to determine a first candidate resource that is used when the first reference signal is transmitted in the cell that uses the unlicensed frequency band, where a channel on the unlicensed frequency band corresponding to the first candidate resource is in an idle state, and the first candidate resource is the preset resource or a flexible candidate resource in the candidate resource set.

The sending unit 503 is configured to send the first reference signal on the first candidate resource.

For example, a channel busy/idle state of the preset resource and the flexible candidate resource may be determined in chronological order. It is assumed that there are totally three resources available for sending the reference signal this time, and an emerging sequence of these three resources in terms of time is: a first flexible candidate resource, the preset resource, and a second flexible candidate resource.

Therefore, whether a channel on the first flexible candidate resource is idle may be first determined, and if the channel is idle, the reference signal is sent on the first flexible candidate resource (in this case, the first flexible candidate resource is the first candidate resource). Conversely, if the channel on the first flexible candidate resource is busy, whether a channel on the preset resource is idle needs to be further determined, and if the channel is idle, the reference signal is sent on the preset resource. Conversely, if the channel on the preset resource is busy, whether a channel on the second flexible candidate resource is idle needs to be further determined, and if the channel is idle, the reference signal is sent on the second flexible candidate resource (in this case, the second flexible candidate resource is the first candidate resource). Conversely, if the channel on the second flexible candidate resource is busy, the first reference signal cannot be sent on the second flexible candidate resource, that is, sending of the first reference signal this time fails.

Based on the foregoing technical solutions, in this embodiment of the present invention, a candidate resource set is determined for sending a reference signal, so as to increase a sending opportunity of the reference signal. Therefore, according to this embodiment of the present invention, a success rate of sending the reference signal can be improved without affecting normal system communication.

Further, when the reference signal is sent in a communications system that uses the unlicensed spectrum, the solutions provided in this embodiment of the present invention can meet requirements for cell synchronization and CSI measurement, and further ensure demodulation and mobility performance of the UE.

In addition, a mainstream deployment scenario of this embodiment of the present invention is to perform carrier aggregation on the primary serving cell on the licensed spectrum and the U-LTE secondary serving cell on the unlicensed spectrum for use. The LTE primary serving cell and the U-LTE secondary serving cell may be deployed at a same site, or may be deployed at different sites, and there is an ideal backhaul path between the two serving cells.

Alternatively, in the present invention, deployment may be performed in a scenario in which there is no ideal backhaul path between the two serving cells, for example, a backhaul delay is relatively high, and consequently, information cannot be coordinated quickly between the two serving cells. In addition, a U-LTE serving cell that may be independently accessed may also be deployed in this embodiment of the present invention, that is, carrier aggregation does not need to be performed on the U-LTE serving cell and the LTE serving cell in this case. Examples of the foregoing application scenarios are merely intended to help a person skilled in the art better understand this embodiment of the present invention, but not to limit the scope of this embodiment of the present invention.

Optionally, in an embodiment, the second determining unit 502 is specifically configured to start clear channel assessment CCA on the unlicensed frequency band at a preset time interval before the first candidate resource to obtain a result of the CCA. Then, it is determined, according to the result of the CCA, that the channel on the unlicensed frequency band corresponding to the first candidate resource is in the idle state.

Optionally, in another embodiment, the second determining unit 502 is specifically configured to: when the result of the CCA indicates that the channel is idle, determine that the channel on the unlicensed frequency band corresponding to the first candidate resource is in the idle state; or when the result of the CCA indicates that the channel is idle, perform random backoff, and when the channel is still idle within a time period of the random backoff, determine that the channel on the unlicensed frequency band corresponding to the first candidate resource is in the idle state.

Therefore, when a result of the CCA indicates that a channel is idle, the first reference signal is sent directly on a first candidate resource but random backoff is not performed, which can improve a priority of sending a reference signal, and further improve a success rate of sending the reference signal.

Alternatively, when a result of the CCA indicates that a channel is idle, random backoff is first performed. The first reference signal is sent on a first candidate resource only when the channel is still idle within a time period of the random backoff. This can protect signal transmission of another communications device in a system, and prevent mutual interference between transmission of the reference signal of the cell and the signal transmission of the another communications device.

Optionally, a start point of starting the foregoing CCA may be a start moment of the first subframe in the time window, and in this case, the foregoing preset time interval is 5 symbols. Alternatively, the foregoing preset time interval may be a current maximum backoff time, for example, a length of a contention window in a backoff mechanism, which is specifically equal to a CCA unit time length multiplied by a maximum value of a value range of a backoff counter. It should be noted that these examples are merely intended to help a person skilled in the art better understand this embodiment of the present invention, but not to limit the scope of this embodiment of the present invention.

Optionally, in another embodiment, the sending unit 503 is specifically configured to: if it is determined that a moment when the channel is in the idle state is the same as a start moment of the first candidate resource, send the first reference signal on the first candidate resource.

That is, when it is determined, according to the result of the CCA, that the moment when the channel is idle is the same as the start moment of the first candidate resource, the reference signal may be sent directly on the first candidate resource. It should be understood that, the moment when the channel is idle being the same as the start moment of the first candidate resource does not mean strict consistency in digits, and it may be considered that the moment when a channel busy/idle state is determined as idle is the same as the start moment of the first candidate resource provided that a difference between the two is less than a preset threshold.

Alternatively, if it is determined that a moment when the channel is in the idle state is earlier than a start moment of the first candidate resource, a fill-in signal is sent to occupy the channel until the start moment of the first candidate resource, and then the first reference signal starts to be sent on the first candidate resource.

Optionally, in another embodiment, the first reference signal includes a reference signal used for cell synchronization. The sending unit 503 is further configured to: when the first candidate resource occupies a corresponding quantity of last symbols of a timeslot, send a second reference signal at the beginning of a next timeslot when the first candidate resource ends.

The second reference signal includes one or more of a cell-specific reference signal CRS, a channel state information-reference signal CSI-RS, or a positioning reference signal PRS.

Optionally, in another embodiment, the first reference signal includes a reference signal used for cell synchronization, and the sending unit 503 is further configured to: when the first candidate resource does not occupy a corresponding quantity of last symbols of a timeslot, send, when the first candidate resource ends, a fill-in signal until the timeslot ends, and send a second reference signal at the beginning of a next timeslot.

The second reference signal includes one or more of a cell-specific reference signal CRS, a channel state information-reference signal CSI-RS, or a positioning reference signal PRS.

Optionally, in another embodiment, the flexible candidate resource is a resource that is obtained after the preset resource is translated forward or backward in terms of time.

Optionally, in another embodiment, a granularity of the translation in terms of time is one or more timeslots.

Optionally, in another embodiment, the flexible candidate resource occupies a corresponding quantity of last symbols of a timeslot in the time window.

For example, assuming that the flexible candidate resource occupies two symbols in the time domain, the flexible candidate resource is a resource corresponding to last two symbols of a timeslot in the time window.

Optionally, in another embodiment, the time window is the same as a time window in which a flexible candidate resource used by a neighboring cell of a same frequency to send the first reference signal is located.

For example, multiple U-LTE secondary serving cells at a same frequency may select a same time window. That is, lengths and emerging periods of time windows of all U-LTE secondary serving cells are the same. Therefore, the UE may identify and measure all cells at the frequency as far as possible in the time window, which reduces UE measurement complexity and reduces power consumption of the UE. In addition, coordination between all the U-LTE secondary serving cells is also ensured.

Figure 6:
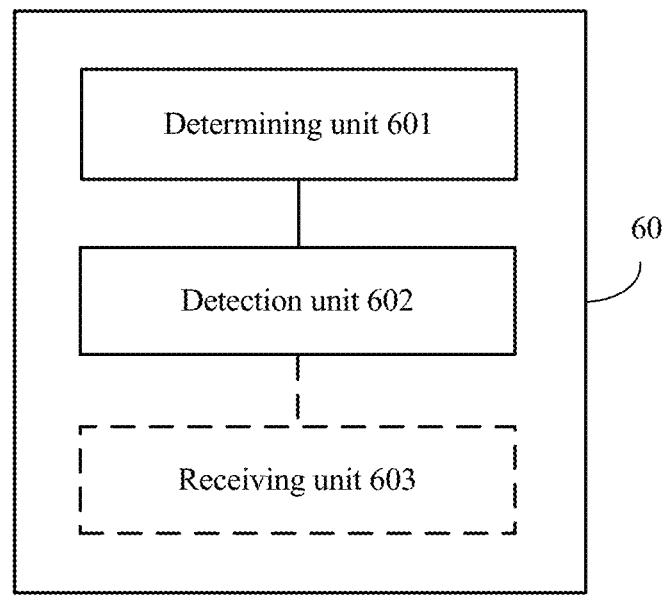
FIG. 6 is a schematic block diagram of user equipment according to an embodiment.

FIG. 6 is a schematic block diagram of user equipment according to an embodiment of the present invention. The user equipment shown in FIG. 6 includes a determining unit 601 and a detection unit 602.

The determining unit 601 is configured to determine a time window in which a candidate resource set, used when a first reference signal is transmitted in a cell that uses an unlicensed frequency band, is located, where the candidate resource set includes a preset resource and at least one flexible candidate resource, the preset resource is a resource that is in the time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period.

For example, a system using an unlicensed frequency band to perform communication includes: an LTE system U-LTE deployed on the unlicensed frequency band, a WLAN system, and the like. For example, to improve a service capability, generally carrier aggregation is performed on a U-LTE serving cell and a primary serving cell to serve UE, where the U-LTE serving cell is used as a secondary serving cell and deployed on an unlicensed spectrum, and the primary serving cell is deployed on a licensed spectrum.

When providing a service for the UE, a secondary serving cell that uses the unlicensed frequency band generally needs to send some reference signals to the UE for cell identification, cell synchronization, channel measurement, interference measurement, and the like. However, during a process of sending a reference signal to the UE by occupying, according to a preset period, the preset resource, due to limitations of the LBT specification, sending of the reference signal cannot be completed when a channel is occupied.

According to the method in this embodiment of the present invention, determining the candidate resource set for sending the reference signal increases a sending opportunity of the reference signal, which can further improve a success rate of sending the reference signal. The candidate resource set includes the preset resource and the at least one flexible candidate resource. The flexible candidate resource and the preset resource use a same frequency, which means that the flexible candidate resource is a resource that is obtained after the preset resource is translated in terms of time. In addition, the flexible candidate resource also needs to fall within the time window that emerges periodically.

Specifically, the second period in which the time window emerges is greater than the preset first period for sending the reference signal. For example, the first period may be 5 ms, and the second period is 40 ms or 80 ms. It should be understood that these examples are merely intended to help a person skilled in the art better understand this embodiment of the present invention, but not to limit the scope of this embodiment of the present invention. A length of the time window may be determined with reference to a status such as a channel busyness level, which is not limited in this embodiment of the present invention.

Therefore, the UE may first determine the time window (such as a length and an emerging period of the time window) in which the flexible candidate resource is located, and may further learn time when the first reference signal needs to be detected.

The detection unit 602 is configured to detect the first reference signal on the unlicensed frequency band in the time window.

For example, when multiple neighboring cells (such as U-LTE secondary serving cells) using a same frequency use a same time window, first reference signals sent by the multiple neighboring cells may be detected at the same time.

Based on the foregoing technical solutions, in this embodiment of the present invention, a candidate resource set is determined for sending a reference signal, so as to increase a sending opportunity of the reference signal. Therefore, according to this embodiment of the present invention, a success rate of sending the reference signal can be improved without affecting normal system communication.

Further, when the reference signal is sent in a communications system that uses the unlicensed spectrum, the solutions provided in this embodiment of the present invention can meet requirements for cell synchronization and CSI measurement, and further ensure demodulation and mobility performance of the UE.

In addition, a mainstream deployment scenario of this embodiment of the present invention is to perform carrier aggregation on the primary serving cell on the licensed spectrum and the U-LTE secondary serving cell on the unlicensed spectrum for use. The LTE primary serving cell and the U-LTE secondary serving cell may be deployed at a same site, or may be deployed at different sites, and there is an ideal backhaul path between the two serving cells.

Alternatively, in the present invention, deployment may be performed in a scenario in which there is no ideal backhaul path between the two serving cells, for example, a backhaul delay is relatively high, and consequently, information cannot be coordinated quickly between the two serving cells. In addition, a U-LTE serving cell that may be independently accessed may also be deployed in this embodiment of the present invention, that is, carrier aggregation does not need to be performed on the U-LTE serving cell and the LTE serving cell in this case. Examples of the foregoing application scenarios are merely intended to help a person skilled in the art better understand this embodiment of the present invention, but not to limit the scope of this embodiment of the present invention.

Optionally, in an embodiment, the first reference signal includes a reference signal used for cell synchronization. The detection unit 602 is further configured to: if the first reference signal is successfully detected, detect a second reference signal on the unlicensed frequency band, where in terms of time, a transmission resource occupied by the second reference signal is later than a transmission resource occupied by the first reference signal, and the second reference signal includes one or more of a cell-specific reference signal CRS, a channel state information-reference signal CSI-RS, or a positioning reference signal PRS.

For example, before the first reference signal is successfully detected, the UE may assume that a base station does not send the second reference signal; therefore, the UE does not perform detection on or make other corresponding preparations for the second reference signal. The UE performs detection on the second reference signal only after the first reference signal is successfully detected.

It is assumed that the first reference signal is PSS/SSS. After detecting the PSS/SSS, the UE may determine, based on the PSS/SSS, a resource location of the second reference signal such as the CRS. Optionally, a flexible candidate resource of the PSS/SSS may be based on time domain translation at a timeslot level or a subframe level, that is, the flexible candidate resource of the PSS/SSS may be on last two symbols of a timeslot or a subframe. Therefore, it may be determined that the CRS after the PSS/SSS occupies an entire timeslot or subframe, and a resource location of the CRS in the timeslot or the subframe is not changed, which has no impact on normal data scheduling and sending of another reference signal. That is, the UE assumes that the second reference signal exists after the detected PSS/SSS, that is, it is assumed that the CRS does not exist before a time domain location of the detected PSS/SSS, which may prevent the UE from performing blind detection on existence of the CRS.

Optionally, in another embodiment, the user equipment further includes a receiving unit 603, configured to receive Radio Resource Control RRC signaling sent by a base station, where the RRC signaling carries a length and an emerging period of the time window.

Optionally, in another embodiment, the flexible candidate resource is a resource that is obtained after the preset resource is translated forward or backward in terms of time.

Optionally, in another embodiment, a granularity of the translation in terms of time is one or more timeslots.

Optionally, in another embodiment, the flexible candidate resource occupies a corresponding quantity of last symbols of a timeslot in the time window.

For example, assuming that the flexible candidate resource occupies two symbols in the time domain, the flexible candidate resource is a resource corresponding to last two symbols of a timeslot in the time window.

Optionally, in another embodiment, the time window is the same as a time window in which a flexible candidate resource used by a neighboring cell of a same frequency to send the first reference signal is located.

For example, multiple U-LTE secondary serving cells at a same frequency may select a same time window. That is, lengths and emerging periods of time windows of all U-LTE secondary serving cells are the same. Therefore, the UE may identify and measure all cells at the frequency as far as possible in the time window, which reduces UE measurement complexity and reduces power consumption of the UE. In addition, coordination between all the U-LTE secondary serving cells is also ensured.

Figure 7:
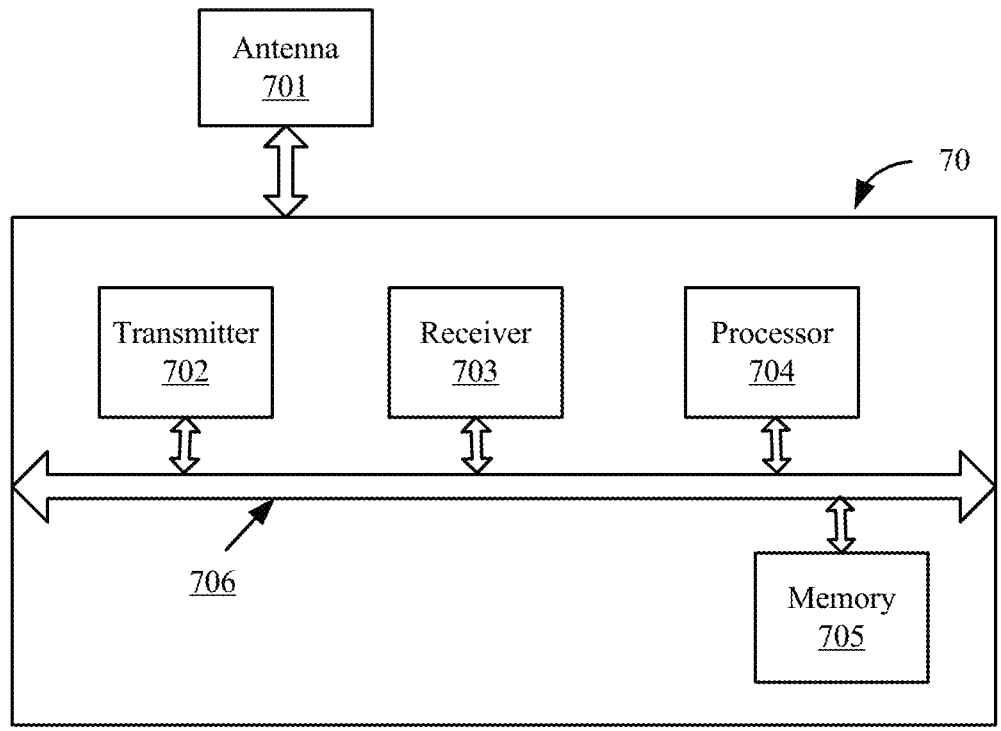
FIG. 7 is a schematic block diagram of a base station according to another embodiment.

FIG. 7 is a schematic block diagram of a base station according to another embodiment of the present invention. A base station 70 in FIG. 7 may be configured to implement steps and methods in the foregoing method embodiments. In the embodiment of FIG. 7, the base station 70 includes an antenna 701, a transmitter 702, a receiver 703, a processor 704, and a memory 705. The processor 704 controls an operation of the base station 70, and may be configured to process a signal. The memory 705 may include a read-only memory and a random access memory, and provides an instruction and data for the processor 704. The transmitter 702 and the receiver 703 may be coupled to the antenna 701. All components of the base station 70 are coupled together by using a bus system 706, where the bus system 706 includes a power bus, a control bus, and a status signal bus in addition to a data bus. However, for clarity of description, various buses are marked as the bus system 706 in the figure.

Specifically, the memory 705 may store instructions for executing the following processes. Determining a candidate resource set that is used when a first reference signal is transmitted in a cell that uses an unlicensed frequency band, where the candidate resource set includes a preset resource and at least one flexible candidate resource, the preset resource is a resource that is in a time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period. Determining a first candidate resource that is used when the first reference signal is transmitted in the cell that uses the unlicensed frequency band, where a channel on the unlicensed frequency band corresponding to the first candidate resource is in an idle state, and the first candidate resource is the preset resource or a flexible candidate resource in the candidate resource set, and sending the first reference signal on the first candidate resource.

Based on the foregoing technical solutions, in this embodiment of the present invention, a candidate resource set is determined for sending a reference signal, so as to increase a sending opportunity of the reference signal. Therefore, according to this embodiment of the present invention, a success rate of sending the reference signal can be improved without affecting normal system communication.

Further, when the reference signal is sent in a communications system that uses the unlicensed spectrum, the solutions provided in this embodiment of the present invention can meet requirements for cell synchronization and CSI measurement, and further ensure demodulation and mobility performance of the UE.

In addition, a mainstream deployment scenario of this embodiment of the present invention is to perform carrier aggregation on the primary serving cell on the licensed spectrum and the U-LTE secondary serving cell on the unlicensed spectrum for use. The LTE primary serving cell and the U-LTE secondary serving cell may be deployed at a same site, or may be deployed at different sites, and there is an ideal backhaul path between the two serving cells.

Alternatively, in the present invention, deployment may be performed in a scenario in which there is no ideal backhaul path between the two serving cells, for example, a backhaul delay is relatively high, and consequently, information cannot be coordinated quickly between the two serving cells. In addition, a U-LTE serving cell that may be independently accessed may also be deployed in this embodiment of the present invention, that is, carrier aggregation does not need to be performed on the U-LTE serving cell and the LTE serving cell in this case. Examples of the foregoing application scenarios are merely intended to help a person skilled in the art better understand this embodiment of the present invention, but not to limit the scope of this embodiment of the present invention.

Optionally, in an embodiment, the memory 705 may further store instructions for executing the following processes. Starting clear channel assessment CCA on the unlicensed frequency band at a preset time interval before the first candidate resource to obtain a result of the CCA; and determining, according to the result of the CCA, that the channel on the unlicensed frequency band corresponding to the first candidate resource is in the idle state.

Optionally, in another embodiment, the memory 705 may further store instructions for executing the following processes. When the result of the CCA indicates that the channel is idle, determining that the channel on the unlicensed frequency band corresponding to the first candidate resource is in the idle state, or, when the result of the CCA indicates that the channel is idle, performing random backoff, and when the channel is still idle within a time period of the random backoff, determining that the channel on the unlicensed frequency band corresponding to the first candidate resource is in the idle state.

Optionally, in another embodiment, the memory 705 may further store instructions for executing the following processes, if it is determined that a moment when the channel is in the idle state is the same as a start moment of the first candidate resource, sending the first reference signal on the first candidate resource, or if it is determined that a moment when the channel is in the idle state is earlier than a start moment of the first candidate resource, sending a fill-in signal to occupy the channel until the start moment of the first candidate resource, and then starting to send the first reference signal on the first candidate resource.

Optionally, in another embodiment, the memory 705 may further store instructions for executing the following processes.

The first reference signal includes a reference signal used for cell synchronization, and after the first reference signal is sent on the first candidate resource, when the first candidate resource occupies a corresponding quantity of last symbols of a timeslot, a second reference signal is sent at the beginning of a next timeslot when the first candidate resource ends.

The second reference signal includes one or more of a cell-specific reference signal CRS, a channel state information-reference signal CSI-RS, or a positioning reference signal PRS.

Optionally, in another embodiment, the memory 705 may further store instructions for executing the following processes.

The first reference signal includes a reference signal used for cell synchronization, and after the first reference signal is sent on the first candidate resource, when the first candidate resource does not occupy a corresponding quantity of last symbols of a timeslot, a fill-in signal is sent, when the first candidate resource ends, until the timeslot ends, and a second reference signal is sent at the beginning of a next timeslot.

The second reference signal includes one or more of a cell-specific reference signal CRS, a channel state information-reference signal CSI-RS, or a positioning reference signal PRS.

Optionally, in another embodiment, the memory 705 may further store an instruction for executing the following process.

The flexible candidate resource is a resource that is obtained after the preset resource is translated forward or backward in terms of time.

Optionally, in another embodiment, the memory 705 may further store an instruction for executing the following process:

A granularity of the translation in terms of time is one or more timeslots.

Optionally, in another embodiment, the memory 705 may further store an instruction for executing the following process:

The flexible candidate resource occupies a corresponding quantity of last symbols of a timeslot in the time window.

Optionally, in another embodiment, the memory 705 may further store an instruction for executing the following process:

The time window is the same as a time window in which a flexible candidate resource used by a neighboring cell of a same frequency to send the first reference signal is located.

Figure 8:
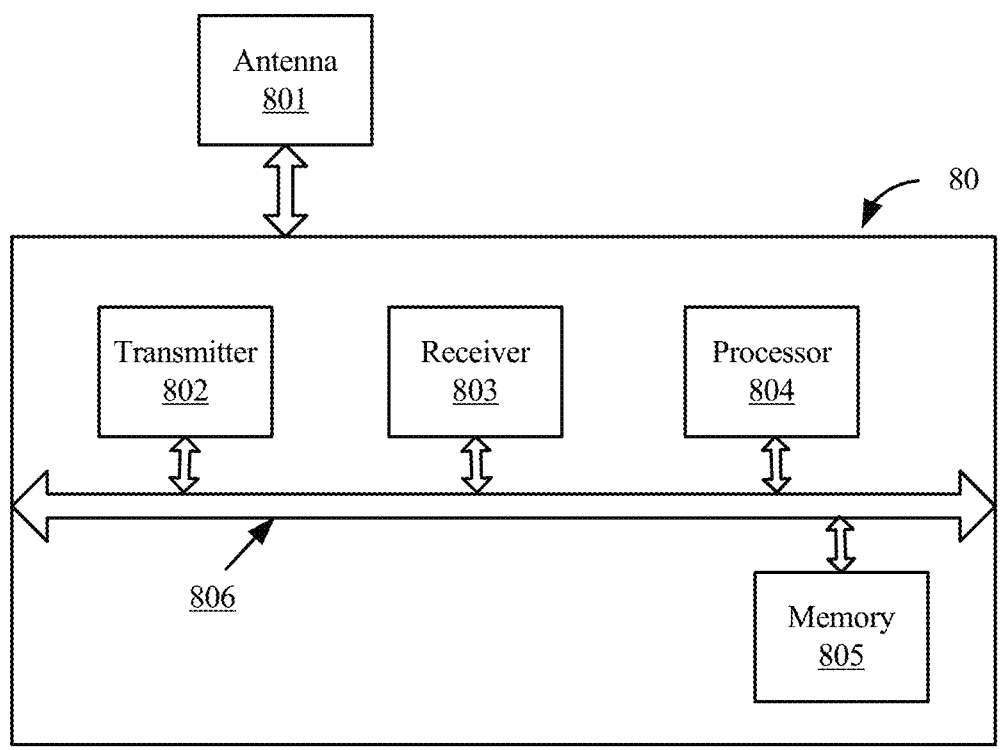
FIG. 8 is a schematic block diagram of user equipment according to another embodiment.

FIG. 8 is a schematic block diagram of user equipment according to another embodiment of the present invention. User equipment 80 in FIG. 8 may be configured to implement steps and methods in the foregoing method embodiments. In the embodiment of FIG. 8, the user equipment 80 includes an antenna 801, a transmitter 802, a receiver 803, a processor 804, and a memory 805. The processor 804 controls an operation of the user equipment 80, and may be configured to process a signal. The memory 805 may include a read-only memory and a random access memory, and provides an instruction and data for the processor 804. The transmitter 802 and the receiver 803 may be coupled to the antenna 801. All components of the user equipment 80 are coupled together by using a bus system 806, where the bus system 806 includes a power bus, a control bus, and a status signal bus in addition to a data bus. However, for clarity of description, various buses are marked as the bus system 806 in the figure.

The memory 805 may store instructions for executing the following processes. Determining a time window in which a candidate resource set, used when a first reference signal is transmitted in a cell that uses an unlicensed frequency band, is located, where the candidate resource set includes a preset resource and at least one flexible candidate resource, the preset resource is a resource that is in the time window and that is required, when the cell is in an active state, for transmission of the first reference signal according to a first period, and the flexible candidate resource is a candidate resource that is in the time window and that is obtained after the preset resource is translated in terms of time, where a period in which the time window emerges is a second period, and the second period is greater than the first period, and detecting the first reference signal on the unlicensed frequency band in the time window.

Based on the foregoing technical solutions, in this embodiment of the present invention, a candidate resource set is determined for sending a reference signal, so as to increase a sending opportunity of the reference signal. Therefore, according to this embodiment of the present invention, a success rate of sending the reference signal can be improved without affecting normal system communication.

Further, when the reference signal is sent in a communications system that uses the unlicensed spectrum, the solutions provided in this embodiment of the present invention can meet requirements for cell synchronization and CSI measurement, and further ensure demodulation and mobility performance of the UE.

In addition, a mainstream deployment scenario of this embodiment of the present invention is to perform carrier aggregation on the primary serving cell on the licensed spectrum and the U-LTE secondary serving cell on the unlicensed spectrum for use. The LTE primary serving cell and the U-LTE secondary serving cell may be deployed at a same site, or may be deployed at different sites, and there is an ideal backhaul path between the two serving cells.

Alternatively, in the present invention, deployment may be performed in a scenario in which there is no ideal backhaul path between the two serving cells, for example, a backhaul delay is relatively high, and consequently, information cannot be coordinated quickly between the two serving cells. In addition, a U-LTE serving cell that may be independently accessed may also be deployed in this embodiment of the present invention, that is, carrier aggregation does not need to be performed on the U-LTE serving cell and the LTE serving cell in this case. Examples of the foregoing application scenarios are merely intended to help a person skilled in the art better understand this embodiment of the present invention, but not to limit the scope of this embodiment of the present invention.

Optionally, in an embodiment, the memory 805 may further store an instruction for executing the following process.

The first reference signal includes a reference signal used for cell synchronization, and after the first reference signal is detected on the unlicensed frequency band, if the first reference signal is successfully detected, a second reference signal is detected on the unlicensed frequency band, where in terms of time, a transmission resource occupied by the second reference signal is later than a transmission resource occupied by the first reference signal, and the second reference signal includes one or more of a cell-specific reference signal CRS, a channel state information-reference signal CSI-RS, or a positioning reference signal PRS.

Optionally, in another embodiment, the memory 805 may further store an instruction for executing the following process. Before the determining a time window in which a candidate resource set, used when a first reference signal is transmitted in the cell that uses the unlicensed frequency band, is located, receiving Radio Resource Control RRC signaling sent by a base station, where the RRC signaling carries a length and an emerging period of the time window.

Optionally, in another embodiment, the memory 805 may further store an instruction for executing the following process.

The flexible candidate resource is a resource that is obtained after the preset resource is translated forward or backward in terms of time.

Optionally, in another embodiment, the memory 805 may further store an instruction for executing the following process.

A granularity of the translation in terms of time is one or more timeslots.

Optionally, in another embodiment, the memory 805 may further store an instruction for executing the following process.

The flexible candidate resource occupies a corresponding quantity of last symbols of a timeslot in the time window.

Optionally, in another embodiment, the memory 805 may further store an instruction for executing the following process.

The time window is the same as a time window in which a flexible candidate resource used by a neighboring cell of a same frequency to send the first reference signal is located.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or at least two units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   starting a backoff counter of a random backoff process for a first clear channel assessment (CCA) for sending data;
   performing, during the random backoff process and on an unlicensed frequency band, a second CCA for sending a reference signal;
   sending the reference signal in the unlicensed frequency band and suspending the backoff counter in response to success of the second CCA; and
   resuming the backoff counter after sending the reference signal.

2. The method according to claim 1, further comprising:
   performing the first CCA for sending data according to the resumed backoff counter.

3. The method according to claim 1, wherein the sending the reference signal comprises:
   sending the reference signal in a time window, wherein the time window has a period of 40 ms or 80 ms.

4. The method according to claim 1, wherein the reference signal comprises a primary synchronization signal (PSS) and a secondary synchronization signal (SSS).

5. The method according to claim 4, wherein the reference signal further comprises a cell-specific reference signal (CRS).

6. The method according to claim 4, wherein the reference signal is associated with at least one of cell identification, cell measurement or cell synchronization.

7. The method according to claim 1, wherein the resuming the backoff counter comprises resuming the backoff counter after the reference signal is entirely sent.

8. A base station, comprising:
one or more processors; and
a non-transitory computer-readable storage medium storing a program to be executed by the one or more processors, the program comprising instructions to:
start a backoff counter of a random backoff process for a first clear channel assessment (CCA) for sending data;
perform, during the random backoff process, a second CCA on an unlicensed frequency band for sending a reference signal;
send the reference signal in the unlicensed frequency band and suspend the backoff counter in response to success of the second CCA; and
resume the backoff counter after sending the reference signal.

9. The base station according to claim 8, wherein the program comprises instructions to perform the first CCA for the sending data according to the resumed backoff counter.

10. The base station according to claim 8, wherein the instructions to send the reference signal include instructions to:
send the reference signal in a time window, wherein the time window has a period of 40 ms or 80 ms.

11. The base station according to claim 8, wherein the reference signal comprises a primary synchronization signal (PSS) and a secondary synchronization signal (SSS).

12. The base station according to claim 11, wherein the reference signal further comprises a cell-specific reference signal (CRS).

13. The base station according to claim 11, wherein the reference signal is associated with at least one of cell identification, cell measurement or cell synchronization.

14. The base station according to claim 8, wherein the instructions to resume the backoff counter include instructions to resume the backoff counter after the reference signal is entirely sent.

15. A non-transitory computer-readable storage medium storing a program to be executed by one or more processors, the program comprising instructions to:
start a backoff counter of a random backoff process for a first clear channel assessment (CCA) for sending data;
perform, during the random backoff process, a second CCA on an unlicensed frequency band for sending a reference signal;
send the reference signal in the unlicensed frequency band and suspend the backoff counter in response to success of the second CCA; and
resume the backoff counter after sending the reference signal.

16. The non-transitory computer-readable storage medium according to claim 15, wherein the program comprises instructions to
perform the first CCA for the data sending based on the resumed backoff counter.

17. The non-transitory computer-readable storage medium according to claim 15, wherein the instructions to send the reference signal include instructions to:
send the reference signal in a time window, wherein the time window has a period of 40 ms or 80 ms.

18. The non-transitory computer-readable storage medium according to claim 15, wherein the reference signal comprises a primary synchronization signal (PSS) and a secondary synchronization signal (SSS).

19. The non-transitory computer-readable storage medium according to claim 18, wherein the reference signal further comprises a cell-specific reference signal (CRS).

20. The non-transitory computer-readable storage medium according to claim 18, wherein the reference signal is associated with at least one of cell identification, cell measurement or cell synchronization.

* * * * *